Patented Nov. 13, 1928.

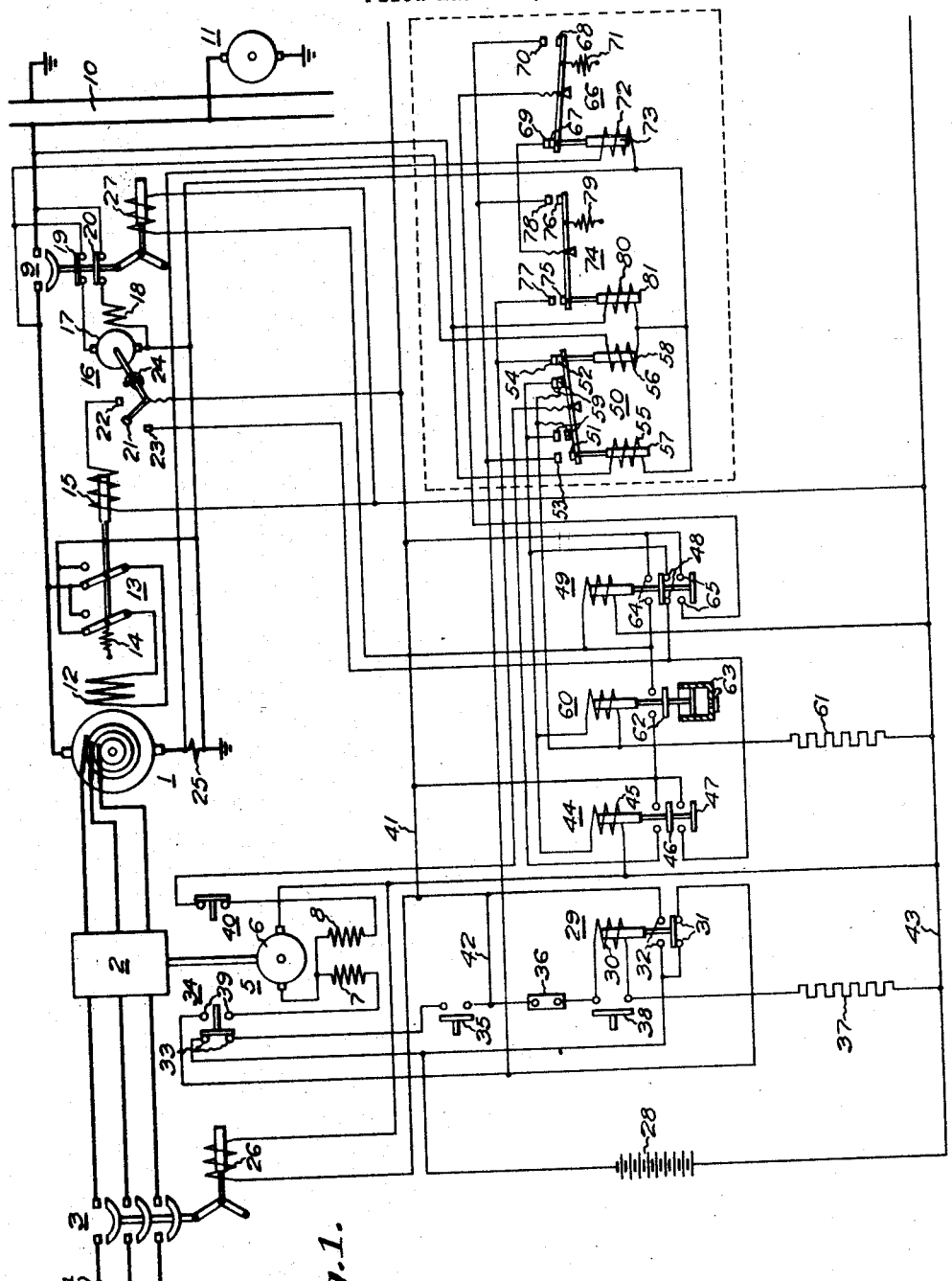

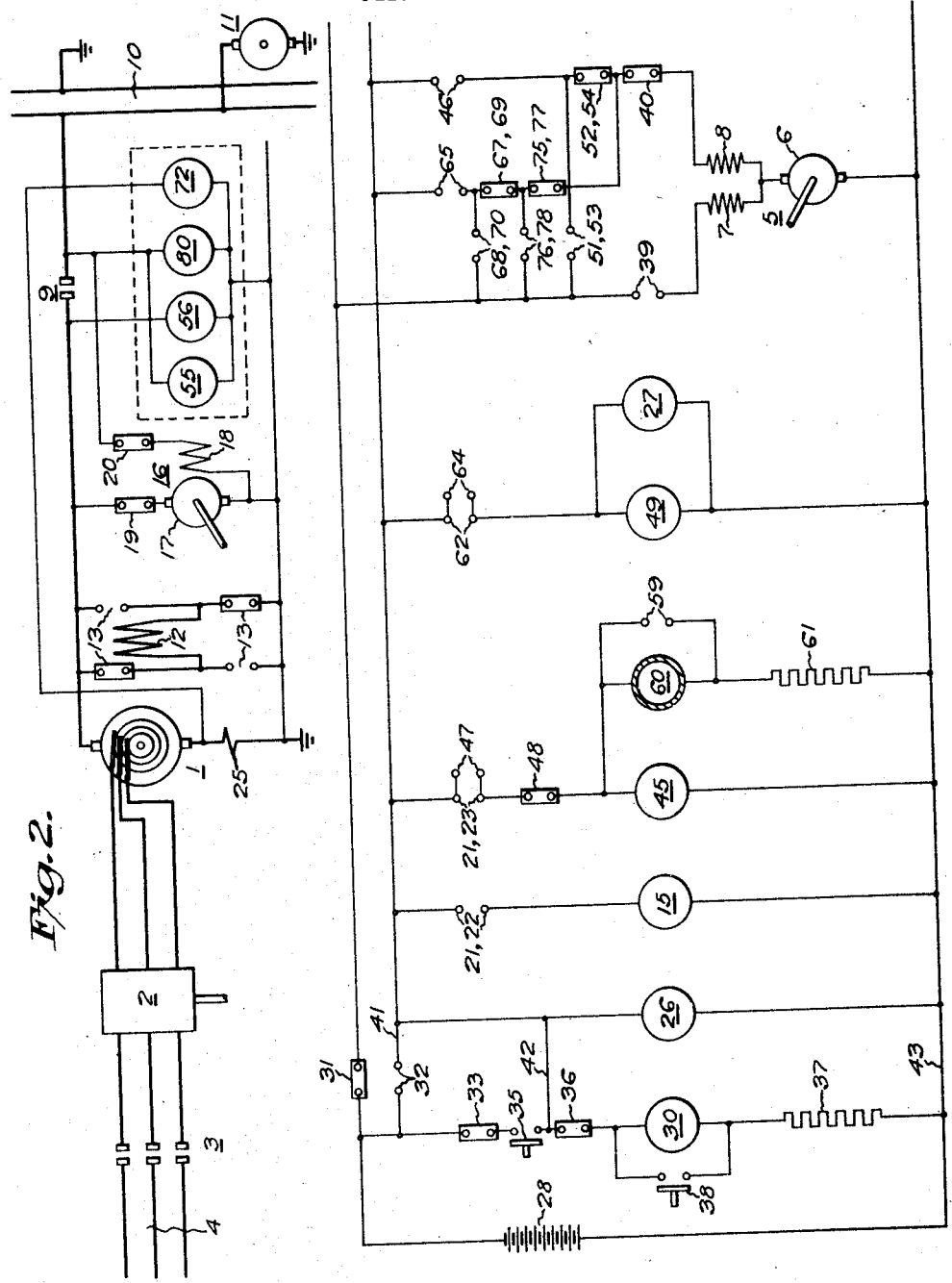

1,691,377

UNITED STATES PATENT OFFICE.

CHARLES A. BUTCHER, OF FOREST HILLS, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed March 18, 1927. Serial No. 176,450.

My invention relates to automatic stations and more particularly to stations wherein a rotary converter is provided for translating energy between an alternating-current circuit and a direct-current circuit.

The principal object of my invention is to provide means for regulating the alternating-current voltage applied to a rotary converter for the purpose of starting the converter from rest and also for controlling the direct-current voltage of the converter and the load assumed by the converter.

In the past, it has been customary to provide a power transformer with intermediate taps for the purpose of supplying reduced alternating-current voltage to a rotary converter to start the same from rest and to bring it up to its normal operating speed. This system necessitates the provision of both a starting and a running circuit interrupter for transferring the connections of the rotary converter from the starting taps of the transformer to the full-voltage connection. It has also been customary to provide booster converters or other relatively expensive means for regulating the direct-current voltage of a rotary converter.

My invention contemplates the elimination of the starting circuit interrupter and the booster converter for regulating the direct-current voltage of a rotary converter. This result is accomplished by providing a voltage-regulating device, such as a variable-voltage transformer and a step-induction regulator associated therewith, between the alternating-current circuit and the rotary converter.

For the purpose of applying a reduced starting voltage to the converter to start the same from rest, automatic means are provided for actuating the voltage-regulating device to the position in which minimum alternating-current voltage is applied to the converter during the starting period thereof.

When the converter has developed a direct-current voltage of the desired polarity, the voltage-regulating device is automatically controlled to cause the direct-current voltage of the converter to be equalized with that of the direct-current circuit to which the converter is to be connected. The converter is then automatically connected to the direct-current circuit, and the voltage regulating device is controlled to maintain the desired voltage on the direct-current circuit or the desired load on the converter.

Other objects and advantages of my invention will appear from the following description, taken in connection with the accompanying drawings, in which;

Figure 1 is a diagrammatic representation of an automatic station embodying my invention, and Fig. 2 is a schematic representation of the circuits and apparatus shown in Fig. 1.

Referring to the drawings, a rotary converter 1 is adapted to be connected, through a voltage-regulating device 2 and a circuit interrupter 3, to an alternating-current circuit 4. The voltage-regulating device 2 preferably comprises a transformer having windings with suitable taps and a tap-changing mechanism and an induction regulator associated therewith, whereby a wide and uniform variation in the voltage applied to the converter 1 may be effected. For the sake of simplicity, the regulator 2 is shown diagrammatically with a reversible electric motor 5 for actuating the same.

The motor 5 comprises an armature member 6 and two field-magnet windings 7 and 8. The field-magnet winding 7 is so disposed with respect to the armature member 6 that when it is energized the motor 5 actuates the regulator 2 in such manner as to decrease the alternating-current voltage applied to the converter 1. The field-magnet winding 8 is oppositely disposed with respect to the armature member 6 to cause the motor 5 to actuate the regulator 2 in such manner as to increase the alternating-current voltage applied to the rotary converter 1 when the motor is energized through this field-magnet winding.

The direct-current end of the converter 1 is connected through a circuit interrupter 9 to a direct-current circuit 10 that is ordinarily energized from some other source, such as a generator 11. In the usual application of my invention, the circuit 10 will be a feeder circuit for a direct-current distribution system that may be adapted to receive energy from numerous other points.

The converter 1 is provided with a shunt field-magnet winding 12, the connection of which between the direct-current terminals of the converter may be reversed by a switch 13. The switch 13 is normally maintained in the position shown in the drawing by a tension spring 14, but it may be actuated to the reversing position by energizing an operating coil 15. The energization of the operating coil 15 is controlled by a polarity-responsive relay device 16 comprising an armature member 17 and a field-magnet winding 18. The armature member 17 and the field-magnet winding 18 are connected, through auxiliary switches 19 and 20 of the circuit interrupter 9, to the direct-current terminals of the converter 1 and to the direct-current circuit 10, respectively, when the circuit interrupter 9 is in its open position. When the circuit interrupter 9 is closed, the auxiliary switches 19 and 20 are opened to interrupt the circuits of the armature member 17 and the field-magnet winding 18.

The relay device 16 is provided with a movable contact member 21 and two stationary contact members 22 and 23. The movable contact member 21 is maintained, by a spiral spring 24, in an intermediate position between the stationary contact members 22 and 23, except when direct-current is applied to both the armature member 17 and the field-magnet winding 18. When the armature member 17 and the field-magnet winding 18 are energized by direct current of such relative polarity that a reversal of polarity of the converter 1, with respect to the circuit 10 is indicated, the movable contact member 21 is actuated into engagement with the contact member 22, and when the armature member 17 and the field-magnet winding 18 are energized by direct current of corresponding polarity, indicating that the polarity of the converter 1 is the same as that of the circuit 10, the movable contact member 21 is actuated into engagement with the stationary contact member 23.

In addition to the shunt field-magnet winding 12, the rotary converter 1 is provided with a commutating pole field-magnet winding 25. Since the potential drop across the winding 25 is proportional to the current traversing the armature windings of the converter 1, this drop is utilized as an indication of the load on the converter 1 for purposes hereinafter described.

The circuit interrupters 3 and 9 are provided with operating coils 26 and 27, respectively, that are adapted, when energized, to close and maintain closed their respective circuit interrupters. It will be understood that suitable latching and tripping mechanisms may be provided for these circuit interrupters, but, for the purpose of simplicity in showing and describing the system embodying my invention, these circuit interrupters are shown as the magnetic contactor type.

A battery 28 is provided for supplying energy to the various devices hereinafter described, for controlling the operation of the circuit interrupters 3 and 9, the regulating device 2, and the reversing switch 13.

A master relay 29 is provided with an operating coil 30, contact members 31 that are engaged when the coil 30 is deenergized, and contact members 32 that are engaged when the coil 30 is energized. The energizing circuit of the operating coil 30 extends from the upper terminal of the battery 28, through contact members 33 of a limit switch 34 that is associated with the regulating device 2, a manually or automatically operable switch 35, a switch 36 that is normally closed and is adapted to be opened by any desired protective device in the station, and a resistor 37 to the lower terminal of the battery 28. A manually operable switch 38 is connected in parallel relation to the operating coil 30 of the relay 29.

The contact members 31 of the relay 29 are connected in series with contact member 39 of the limit switch 34 between the upper terminal of the battery 28 and one terminal of the field-magnet winding 7 of the reversible electric motor 5. The other terminal of the field-magnet winding 7 and one terminal of the field-magnet winding 8 are connected to one terminal of the armature member 6, the other terminal of which is connected to the lower terminal of the battery 28.

The contact members 39 of the limit switch 34 are adapted to be closed except when the regulating device 2 is actuated to the position in which minimum alternating-current voltage is applied to the converter 1. When the regulating device 2 is actuated to this position, the contact members 39 of the limit switch 34 are disengaged and the contact members 33 are engaged.

The regulating device 2 is also provided with a limit switch 40 having a single pair of contact members that are adapted to be engaged except when the regulating device 2 is actuated to such position that maximum alternating-current voltage is applied to the converter 1. The contact members of the switch 40 are connected in series with the field-magnet winding 8 of the motor 5 to preclude operation of this motor in such direction as to tend to increase the alternating-current voltage applied to the converter 1 when the regulating device 2 has been actuated to the position corresponding to maximum applied voltage.

The contact members 32 of the master relay 29 are connected between the upper terminal of the battery 28 and a control bus 41. A conductor 42 is connected between the control bus 41 and the circuit of the operating coil 30 of the relay 29 to maintain energization of this relay after the manually operable switch 35 is opened.

The operating coil 26 of the circuit interrupter 3 is directly connected between the control bus 41 and a control bus 43 that is connected to the lower terminal of the battery 28. Thus, the circuit interrupter 3 is closed in response to energization of its operating coil 26 as soon as the relay 29 is energized to effect engagement of its contact members 32, thereby energizing the control bus 41 from the upper terminal of the battery 28.

A transfer relay 44 is provided with an operating coil 45 and two switches 46 and 47, both of which are adapted to be closed when the operating coil 45 is energized and open when the operating coil 45 is deenergized. One terminal of the operating coil 45 is connected directly to the control bus 43, and the other terminal thereof is connected through contact members 48 of an auxiliary relay 49, to be hereinafter described, and the contact members 23 and 21 of the relay device 16 to the control bus 41. Thus, the operating coil 45 of the relay 44 is energized in response to engagement of the contact members 21 and 23 of the relay 16. The switch 47 of the relay 44 is connected in parallel relation to the contact members 21 and 23 for the purpose of maintaining energization of the operating coil 45 after the contact members 21 and 23 have been disengaged.

The switch 46 of the relay 44 is connected between the control bus 41 and the balance arm of a voltage-balancing device 50. The voltage-balancing device 50 comprises two movable contact members 51 and 52 that are disposed at opposite extremities of the balance arm, and two stationary contact members 53 and 54 that are adapted to be engaged by the contact members 51 and 52, respectively. The balance arm of the voltage-balancing device 50 is adapted to be actuated in accordance with the relative energization of two solenoid coils 55 and 56 which cooperate with magnetic core members 57 and 58, respectively, that are secured to opposite extremities of the balancing arm.

The coil 55 is connected across the direct-current circuit 10 and the coil 56 is connected between the direct-current terminals of the converter 1. Thus, when the voltage of the circuit 10 exceeds the direct-current voltage of the converter 1, the energization of the coil 55 exceeds that of the coil 56, with the result that the balance arm of the device 50 is biased to the position shown in the drawing, in which the movable contact member 52 is in engagement with the stationary contact member 54. Conversely, when the direct-current voltage of the converter 1 exceeds the voltage of the circuit 10, the energization of the coil 56 exceeds that of the coil 55, with the result that the balance arm of the device 50 is biased to its opposite position, in which the movable contact member 51 engages the stationary contact member 53.

The stationary contact member 54 is connected, through the limit switch 40, to the field-magnet winding 8 of the reversible motor 5 in such manner that the motor 5 is energized through field-magnet winding 8 in response to engagement of the contact members 52 and 54. Similarly, the contact member 53 is connected through the contact members 39 of the limit switch 34 to the field-magnet winding 7 of the motor 5.

The voltage-balancing device 50 is provided with two pairs of auxiliary contact members 59 that are connected in parallel relation to each other and to the operating coil of a time delay relay 60. The operating coil of the relay 60 and a resistor 61 that is connected in series therewith are connected in parallel relation to the operating coil of the relay 45, whereby the energizing circuit of the relay 60 is completed simultaneously with that of the relay 44.

The relay 60 is provided with a single switch 62 and a dash pot, or other suitable time delay device 63, which permits the switch 62 to be actuated to its closed position when the operating coil of the relay has been continuously energized for a predetermined interval of time. The time-delay device 63 is adapted, however, to permit the switch 62 to return immediately to its initial position whenever the operating coil of the relay is deenergized. Thus, the switch 62 can be closed only after the energizing circuit of the relays 44 and 60 is completed, and after the auxiliary contact members 59 of the voltage-balancing device 50 have remained out of engagement for a predetermined interval of time.

One terminal of the operating coil of the auxiliary relay 49 is connected through the switch 62 of the relay 60 to the control bus 41 and the other terminal of this coil is connected directly to the control bus 43. The operating coil 27 of the circuit interrupter 9 is connected in parallel relation to the operating coil of the relay 49. Therefore, the circuit interrupter 9 is closed whenever the relay 49 is energized.

In addition to the contact members 48, which were previously referred to, the relay 49 comprises two pairs of contact members 64 and 65, both of which are adapted to be engaged when the operating coil of the relay 49 is energized. The contact members 64 are connected in parallel relation to the switch 62 of the relay 60 to maintain energization of the operating coil of the relay 49 after the switch 62 is opened.

The contact members 65 of the relay 49 are connected between the control bus 41 and the balance arm of a current regulating device 66. Two movable contact members 67 and 68 are disposed at opposite extremities of the balance arm of the device 66 and are adapted to engage two stationary contact members 69 and 70, respectively. The balance arm is normally biased by a tension spring 71 to the position shown in the drawings, in which the movable contact member 67 is in engagement with the stationary contact member 69.

A solenoid coil 72 cooperates with a magnetic core member 73 that is secured to one extremity of the balance arm of the device 66 in such manner that when the coil 72 is energized to a predetermined degree the balance arm of the device 66 is actuated against the tension of the spring 71 to such position that the movable contact member 68 engages the stationary contact member 70. The coil 72 is connected in parallel relation to the commutating pole or series field-magnet winding 25 of the converter 1 to render the effect of the coil 72 directly proportional to the value of current traversing the armature windings of the converter 1.

The stationary contact member 70 of the current-regulating device 66 is connected through the contact members 39 of the limit switch 34 to the field-magnet winding 7 of the reversible motor 5. The stationary contact member 69 is connected to the balance arm of a voltage regulating device 74, at opposite extremities of which are mounted two movable contact members 75 and 76 that are adapted to engage two stationary contact members 77 and 78, respectively.

The balance arm of the voltage-regulating device 74 is biased by a tension spring 79 toward the position in which the contact members 75 and 77 are in engagement. This bias is opposed by the effect of a solenoid coil 80 which cooperates with a magnetic core member 81 that is secured to the extremity of the balance arm adjacent the contact member 75.

The solenoid coil 80 is connected across the direct-current circuit 10 to render the effect thereof proportional to the voltage of the circuit 10. The stationary contact member 77 is connected through the limit switch 40 to the field-magnet winding 8 of the motor 5, and the stationary contact member 78 is connected through the contact members 39 of the limit switch 34 to the field-magnet winding 7 of the motor 5.

Having now described the various circuits and apparatus utilized in the system embodying my invention, the operation of the system will be described.

Assuming that the rotary converter 1 is at rest and that it is desired that it be started and connected between the circuits 4 and 10, the manually or automatically operable starting switch 35 will be closed momentarily. A circuit is thereby completed from the upper terminal of the battery 28 through the contact members 33 of the limit switch 34, the switch 35, the switch 36 of the protective devices (not shown), the operating coil 30 of the master relay 29 and the resistor 37 to the lower terminal of the battery 28. The relay 29 is thus actuated to open its switch 31 and to close its switch 32.

The switch 32, when closed, connects the control bus 41 to the upper terminal of the battery 28. The operating coil 26 of the circuit interrupter 3, which is connected between the control busses 41 and 43, is thereupon energized to effect closure of the circuit interrupter 3. When the circuit interrupter 3 is closed, the rotary converter 1 is connected to the alternating-current circuit 4 through the voltage regulating device 2 which has previously been actuated to such position that minimum voltage will be applied to the converter 1 when the circuit interrupter 3 is closed. The converter 1 is thus started from rest at a reduced voltage.

As soon as the converter attains synchronous speed, a direct-current voltage will be developed thereby. The polarity of this voltage may be the same as that of the direct-current circuit 10 or it may be reversed with respect to that of the circuit 10. If the polarity should be reversed, the polarity-responsive relay device 16 will be so energized that the movable contact member 21 thereof will be actuated into engagement with the stationary contact member 22, thereby connecting the operating coil 15 of the field reversing switch 13 between the control busses 41 and 43. When the operating coil 15 is energized, the switch 13 is actuated against the tension of the spring 14 to reverse the connections of the shunt field-magnet winding 12 with respect to the direct-current terminals of the converter 1.

When the connections of the field-magnet winding 12 are reversed, the direct-current voltage of the converter 1 is quickly reduced to zero, whereupon the armature member 17 of the relay 16 is deenergized to permit the contact members 21 and 22 to be disengaged by reason of the action of the spring 24. When the contact members 21 and 22 are disengaged, the energizing circuit of the operating coil 15 is interrupted to permit the reversing switch 13 to be actuated back to its normal position by reason of the action of the spring 14. The connections of the field-magnet winding 12 are thus returned to normal to permit the converter 1 to develop a direct-current voltage of the desired polarity.

When the direct-current voltage of the converter 1 has the desired polarity the relay 16 is actuated to effect engagement of its contact members 21 and 23. A circuit is then completed from the bus 41 through the contact members 21 and 23 of the relay 16, the contact members 48 of the relay 49 and the operating coil 45 of the relay 44 to the control bus 43. The operating coil 45 is thus energized to effect closure of the switches 46 and 47.

The energizing circuit of the operating coil of the relay 60 is also completed simultaneously with that of the relay 44, but, since the direct-current voltage of the converter 1 has not been equalized with that of the circuit 10, the auxiliary contact member 59 of the voltage balancing device 50 will be engaged to short-circuit the operating coil of the relay 60. Therefore, this relay does not start to close its switch 62 until the direct-current voltage of the converter 1 becomes equal to that of the circuit 10.

The switch 46 of the relay 44, when closed, connects the balance arm of the voltage-balancing device 50, and the movable contact members 51 and 52 that are mounted thereon, to the control bus 41. Since the voltage-regulating device 2 is in the position which permits only minimum alternating-current voltage to be applied to the converter 1, the direct-current voltage of the converter will be considerably less than that of the circuit 10. Therefore, the solenoid coil 56 of the voltage balancing device 50 will be overbalanced by the coil 55, with the result that the stationary contact member 54 will be engaged by the movable contact member 52, as shown in the drawing. A circuit is thus completed by these contact members from the control bus 41, through the switch 46 of the relay 44, the limit switch 40 and the field-magnet winding 8 and armature member 6 of the motor 5 to the control bus 43.

The motor 5 thereupon actuates the voltage-regulating device 2 in such direction as to increase the alternating-current voltage applied to the converter 1. This increase of voltage is continued at relatively rapid rate until the direct-current voltage of the converter 1 becomes equal to the voltage of the circuit 10, whereupon the effect of the solenoid coil 56 of the voltage-balancing device 50 becomes equal to the effect of the solenoid coil 55. The voltage balancing device 50 is then actuated to disengage its contact members 52 and 54, thereby interrupting the energizing circuit of the motor 5. The motor 5 and the voltage-regulating device 2 thereupon come to rest.

If the voltage regulating device 2 has been actuated beyond the point at which the proper alternating-current voltage is applied to the converter 1, the direct-current voltage of the converter will exceed that of the circuit 10, with the result that the voltage balancing device 50 will effect engagement of its contact members 51 and 53. When this condition occurs, the motor 5 is energized, through its field-magnet winding 7, to actuate the voltage-regulating device 2 in such manner that the alternating-current voltage applied to the converter 1 will be reduced. In this manner the alternating-current voltage applied to the converter 1 will be rapidly adjusted to the value at which the direct-current voltage of the converter is equal to that of the circuit 10.

When these two voltages are balanced, the voltage balancing device 50 will assume the position in which all of its contact members are disengaged. When both pairs of the auxiliary contact members 59 of the voltage-balancing device 50 are disengaged, the short circuit between the terminals of the operating coil of the time delay relay 60 is removed. If the balanced condition continues for an interval of time equal to the setting of the dash pot 63, the relay 60 will actuate its switch 62 to its closed position.

The switch 62, when closed, completes the energizing circuit of the operating coil of the relay 49, which thereupon causes its contact members 48 to be disengaged and its contact members 64 and 65 to be engaged. The disengagement of the contact members 48 interrupts the circuit through which the operating coils of the relays 44 and 60 are energized, thereby permitting these relays to return to their deenergized positions. The switches 46 and 47 of the relay 44 and the switch 62 of the relay 60 are thus opened.

The opening of the switch 46 disconnects the balance arm of the voltage balancing device 50 from the control bus 41, thereby rendering the device 50 ineffective. The opening of the switch 62 in the circuit of the operating coil of the relay 49 does not permit this coil to be deenergized, since the switch 62 is shunted by the switch 64 of the relay 49.

Simultaneously with the energization of the operating coil of the relay 49, the operating coil 27 of the circuit interrupter 9 is also energized to effect closure of this circuit interrupter. The direct-current terminals of the rotary converter 1 are thus connected to the direct-current circuit 10 to permit the converter to supply energy to this circuit.

When the contact members 65 of the relay 49 are engaged, the balance arm of the current-regulating device 66 is connected to the control bus 41. So long as the current traversing the armature windings of the converter 1 does not exceed the maximum desired value, the contact members 67 and 69 will be engaged to extend this connection to the balance arm of the voltage regulating device 74. The voltage-regulating device 74 is thus rendered operative to control the operation of the reversible motor 5 in accordance with the voltage of the direct-current circuit 10.

When the voltage of the circuit 10 is below the desired value, the contact members 75 and 77 are engaged to effect energization of the motor 5 through its field-magnet winding 8, thereby causing the voltage-regulating device 2 to be actuated in such manner that the alternating-current voltage applied to the converter 1 is increased. Conversely, when the voltage of the circuit 10 is above the desired value, the contact members 76 and 78 are engaged to effect energization of the motor 5 through its field-magnet winding 7. The voltage-regulating device 2 is thereupon actuated to decrease the alternating-current voltage applied to the converter 1. Thus, as long as the current traversing the armature windings of the converter 1 remains below the maximum desired value, the voltage-regulating device 2 is so controlled as to maintain the voltage of the circuit 10 constant at the desired value.

If the current traversing the armature windings of the converter 1 exceeds the maximum desired value, the current-regulating device 66 will be actuated to disengage its contact members 67 and 69 and to engage its contact members 68 and 70. Disengagement of the contact members 67 and 69 interrupts the circuit extending to the voltage-regulating device 74, and thereby precludes further control of the motor 5 and regulating device 2 by the regulating device 74. The engagement of the contact members 68 and 70 completes a circuit extending directly through the contact members 39 of the limit switch 34 to the field-magnet winding 7 of the motor 5.

Thus, as soon as the current traversing the armature windings of the converter 1 exceeds the maximum desired value, the current-regulating device 66 effects energization of the motor 5 in such manner that the voltage-regulating device 2 effects an immediate decrease in the alternating-current voltage applied to the converter 1. The decrease in this voltage will be continued until the current traversing the armature windings of the converter 1 is reduced to the maximum desired value. The voltage-regulating device 2 will then be controlled by the current-regulating device 66 cooperating with the voltage regulating device 74 as long as the current traversing the armature windings of the converter 1 tends to exceed the maximum desired value.

As soon as the voltage of the circuit 10 can be restored to its normal value without causing the armature windings of the converter 1 to be traversed by current exceeding the maximum desired value, the current-regulating device 66 will return to its normal position, as shown in the drawing, and the voltage-regulating device 74 will assume control of the voltage-regulating device 2 through the reversible motor 5.

So long as the operation of the converter 1 is continued the alternating-current voltage applied thereto will be automatically varied, in the manner described, to maintain the voltage of the direct-current circuit 10 constant at the desired value if this can be done without overloading the converter 1. If such regulation would cause the converter 1 to be overloaded, the alternating-current voltage applied thereto is so varied as to maintain a constant load on the converter 1 at the maximum desired value.

When it is desired to discontinue the operation of the converter 1, the manually operable switch 38 is momentarily closed to short-circuit the operating coil of the master relay 29. This relay thereupon opens its switch 32 and closes its switch 31. The opening of the switch 32 deenergizes the control bus 41 to which the operating coils 26 and 27 of the circuit interrupters 3 and 9, respectively, are connected, thereby permitting these circuit interrupters to open to disconnect the converter 1 from the alternating-current circuit 4 and the direct-current circuit 10. The several controlling and regulating devices which are energized from the control bus 41 are likewise deenergized in response to the opening of the switch 32 of the master relay 29.

When the switch 31 of the master relay 29 is closed, a circuit is completed from the upper terminal of the battery 28 through the contact members 39 of the limit switch 34 and the field-magnet winding 7 and armature member 6 of the motor 5 to the lower terminal of the battery 28. The motor 5 is thus energized to actuate the voltage-regulating device to the position corresponding to the application of minimum alternating-current voltage to the converter 1. When the voltage-regulating device 2 has been actuated to this position, the contact members 39 of the limit switch 34 are disengaged and the contact members 33 are engaged.

The disengagement of the contact members 39 interrupts the energizing circuit for the motor 5 to preclude further energization thereof after the regulating device 2 has been actuated to its minimum voltage position. The engagement of the contact members 33 establishes a portion of the starting circuit extending from the upper terminal of the battery 28 to the manually operable switch 35 to permit starting of the converter 1 in response to the actuation of the switch 35. All of the apparatus in the station is now in the condition which was originally assumed and is ready to respond to actuation of the starting switch 35 in the manner previously described.

From the foregoing description it will be seen that I have provided a system of automatic control for a rotary converter that is adapted to translate energy between an alternating-current circuit and a direct-current circuit involving many advantages over the systems previously used.

The necessity of providing starting transformer taps and both a starting and running circuit interrupter is entirely eliminated. Also, my invention provides means for balancing the direct-current voltage of the converter with that of the direct-current circuit before effecting connection therebetween, and for regulating the voltage of the direct-current circuit after the converter is connected thereto without providing a booster converter to obtain this result.

While I have shown and described only one specific form of my invention, it will be understood that various changes and modifications may be made in the apparatus and circuits utilized without departing from the spirit and scope of my invention, as set forth in the appended claims.

I claim as my invention:

1. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, switching means for controlling the operation of the circuit interrupters to control the connection of the rotary converter between the alternating-current circuit and the direct-current circuit and means associated with the switching means for controlling the voltage regulating means when the rotary converter is disconnected from the alternating-current circuit and the direct-current circuit.

2. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, switching means for controlling the operation of the circuit interrupters to control the connection of the rotary converter between the alternating-current circuit and the direct-current circuit, and means associated with the switching means for controlling the voltage regulating means when the rotary converter is disconnected from the alternating-current circuit and the direct-current circuit to cause said voltage regulating means to be actuated to such position that minimum voltage will be applied to the rotary converter when it is again connected to the alternating-current circuit.

3. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters, comprising means for closing the first-mentioned circuit interrupter to cause the rotary converter to be started from rest, a means responsive to the difference between the voltage of the direct-current circuit and the direct-current voltage of the rotary converter for controlling the voltage regulating means to cause said voltages to be substantially equalized and means responsive to the equalizing of said voltages for closing the second-mentioned circuit interrupter.

4. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters, comprising means for closing the first-mentioned circuit interrupter to cause the rotary converter to be started from rest, means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the voltage of the direct-current circuit.

5. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, a means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the current traversing the direct-current circuit.

6. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, a means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the voltage of and the current traversing the direct-current circuit.

7. In an electrical system, the combination with an alternating-current circuit, a direct-current circuit and a rotary converter for translating energy therebetween, of a circuit interrputer and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, means for causing the rotary converter to develop a direct-current voltage of a predetermined polarity, means responsive to the difference between the voltage of the direct-current circuit and the direct-current voltage of the rotary converter for controlling the voltage regulating means to cause said voltages to be substantially equalized and means responsive to the equalizing of said voltages for closing the second-mentioned circuit interrupter.

8. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, means for causing the rotary converter to develop a direct-current voltage of a predetermined polarity, means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the voltage of the direct-current circuit.

9. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, means for causing the rotary converter to develop a direct-current voltage of a predetermined polarity, means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the current traversing the direct-current circuit.

10. In an electrical system, the combination with an alternating-current circuit, a direct-current circuit and a rotary converter for translating energy therebetween, of a circuit interrupter and a voltage regulating device between the alternating-current circuit and the rotary converter, a circuit interrupter between the rotary converter and the direct-current circuit, and switching means for controlling the operation of the circuit interrupters comprising means for closing the first-mentioned circuit interrupter to cause the rotary converter to be started from rest, means for causing the rotary converter to develop a direct-current voltage of a predetermined polarity, means responsive to the difference between the voltage of the direct-current circuit and the direct-current voltage of the rotary converter for controlling the voltage regulating means to cause said voltages to be substantially equalized, means responsive to the equalizing of said voltages for closing the second-mentioned circuit interrupter and means rendered operative simultaneously with the closing of said second-mentioned circuit interrupter for controlling the voltage regulating means in accordance with the voltage of and the current traversing the direct-current circuit.

In testimony whereof, I have hereunto subscribed my name this 15th day of March, 1927.

CHARLES A. BUTCHER.